Aug. 5, 1952  R. R. CURTIS  2,605,902
FILTER
Filed Dec. 26, 1946  2 SHEETS—SHEET 1
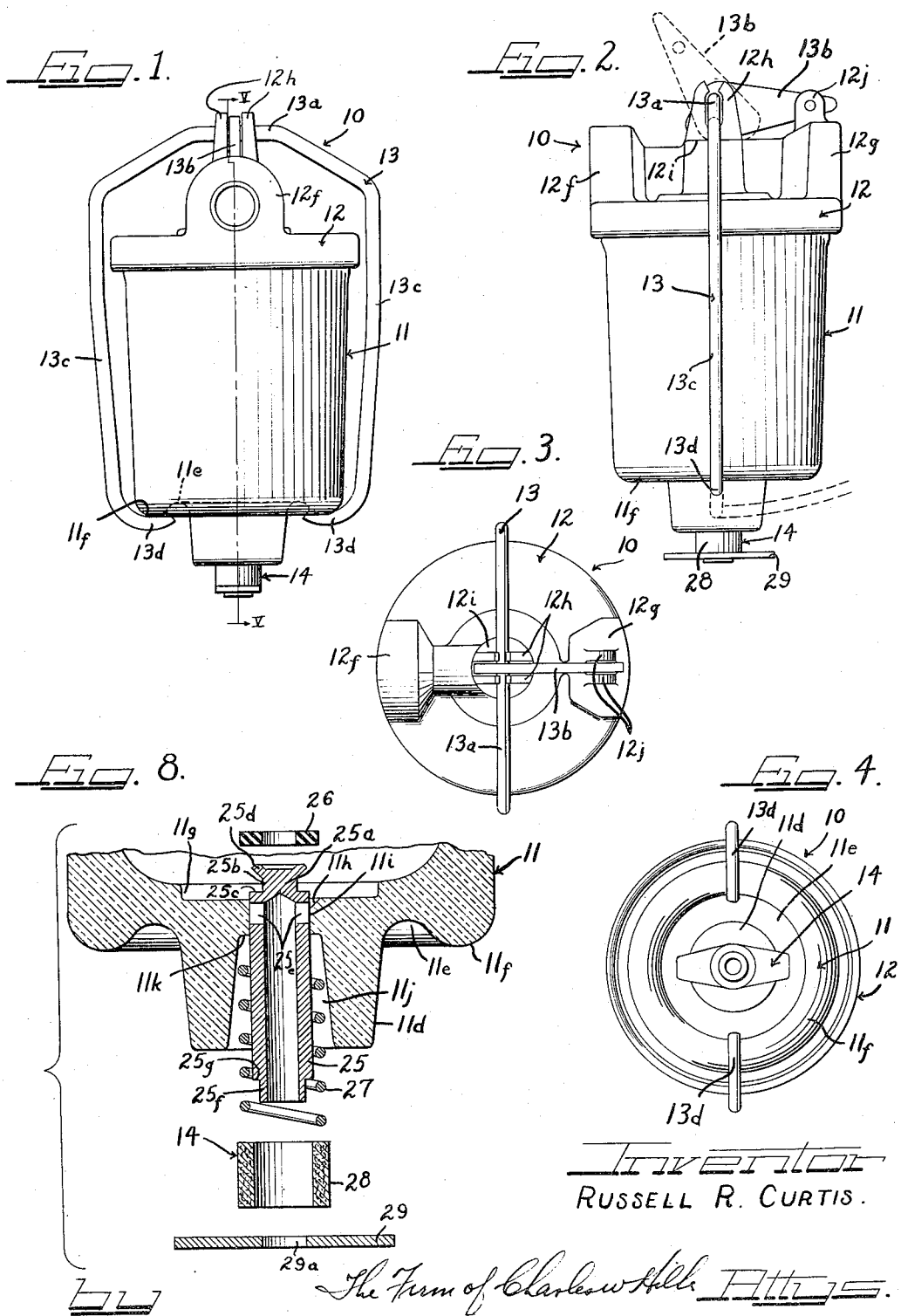
Inventor
RUSSELL R. CURTIS.
The Firm of Charles W. Hills Attys.

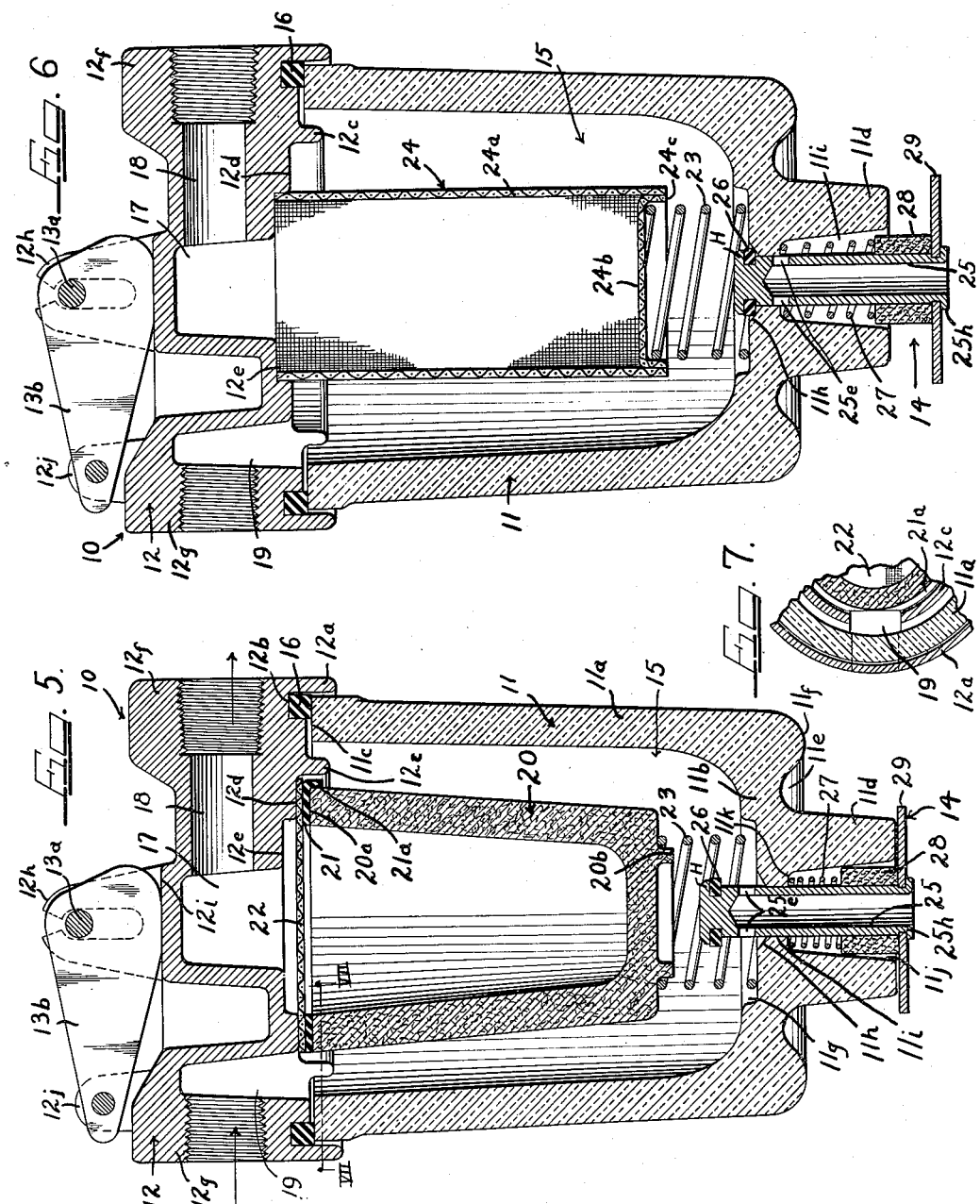

Patented Aug. 5, 1952

2,605,902

UNITED STATES PATENT OFFICE 2,605,902

FILTER

Russell R. Curtis, Dayton, Ohio, assignor to Curtis Automotive Devices, Inc., Dayton, Ohio, a corporation of Ohio Application December 26, 1946, Serial No. 718,307

4 Claims. (Cl. 210—165)

This invention relates to drain valve-equipped filter units and more particularly deals with bowl-type fuel filters for carburetors wherein sediment in the bowl is conveniently removed by drainage through a spring-pressed valve, and wherein a bowl cap or cover is arranged to receive different types of filter units and is equipped with a quick-acting bail arrangement for detachably connecting the bowl therewith.

The invention will hereinafter be specifically described as embodied in a glass bowl-type fuel filter for automobile engine carburetors, but it should be understood that the principles of the invention are generally applicable to filter units and the like wherein sediment is liable to collect and should be periodically removed.

According to this invention, the glass bowl for a filter is equipped with a drain boss on the bottom wall thereof. A drain valve composed of a hollow stem and a valve seat-engaging seal is slidably mounted in the boss. A spring presses against a retainer on the stem to urge the seal against its seat. A handle on the stem is conveniently positioned for manual grasping to raise the stem and retainer into the drain boss, thereby lifting the seal off of its face and exposing outlet ports in the tube to the interior of the bowl. Drainage of the bowl can thereupon take place through the tube and any sediment or filtered-out impurities at the bottom of the bowl will be washed out of the bowl through the valve.

The bowl of the filter is equipped with a cover having inlet and outlet ports. This cover is held in sealed relation with the open top of the bowl by a wire bail swingably carried in a yoke on the cover and having hook-like ends engageable under the bowl. A cam lever acts on the bail between the furcations of the yoke to tighten the bail against the bowl. The cover has recesses in its face which are arranged to receive either the open mouth of a large-diameter ceramic-type filter cup, or a small-diameter screen-type cup. A spring holds either of these cups against the cover so that fuel must first flow through the inlet port of the cover into the bowl and thence through a filter to the outlet port in the cover.

Heretofore it has been necessary to remove the bowl from a bowl-type filter for cleaning sediment out of the bowl. The present invention makes possible removal of sediment from the bowl by mere pressing of a spring-pressed drain valve. In addition the present invention makes possible the removal or replacement of filter cups in the bowl by simple swinging of a cam controlling a bail.

It is, then, an object of the invention to provide a filter having a conveniently-operated sediment drain valve.

Another object of the invention is to provide a glass bowl-type filter with a drain valve that operates through an aperture in the bowl without chipping or cracking the glass.

A still further object of the invention is to provide a bowl-type filter with a cover arranged to receive different types of filter units in sealed engagement therewith.

Another object of the invention is to provide a bowl-type filter with a cam-actuated bail to detachably connect the bowl in sealing relation with a ported cover.

Other and further objects of this invention will be apparent to those skilled in the art from the following detailed description of the annexed sheets of drawings which, by way of a preferred example only, illustrate one embodiment of the invention.

On the drawings:

Figure 1 is a front elevational view of a bowl-type filter according to this invention.

Figure 2 is a side elevational view of the filter.

Figure 3 is a top plan view of the filter.

Figure 4 is a bottom plan view of the filter.

Figure 5 is a vertical cross-sectional view taken along the line V—V of Figure 1, and showing the drain valve in opened position together with a ceramic cup filter in the bowl.

Figure 6 is a view similar to Figure 5, but showing the drain valve in closed position, and illustrating a screen filter cup in the bowl.

Figure 7 is a fragmentary horizontal cross-sectional view taken along the line VII—VII of Figure 5.

Figure 8 is an exploded fragmentary vertical cross-sectional view illustrating the manner in which the parts of the drain valve are assembled.

As shown on the drawings:

The bowl-type filter 10 of Figures 1 to 6 inclusive includes a transparent bowl 11 formed of glass or the like, a die-cast metal or molded plastic cover 12, a bail assembly 13 for uniting the bowl and cover in sealed relation, and a drain valve 14 in the bottom of the bowl 11.

As best shown in Figures 5 and 6, the bowl 11 is composed of glass or other transparent material and has a side wall 11a of circular cross section tapering slightly outward from a bottom wall 11b to an open-top bounded by a flat rim 11c. A chamber 15 is thus provided by the bowl 11. A hollow boss 11d depends from the bottom wall 11b and is surrounded by a groove or recess 11e, which groove, in turn, is surrounded by a rounded bead 11f.

A recess or central well 11g is provided in the bottom 11b communicating with the bottom of the chamber 15. This recess 11g has a beveled valve seat 11h in the central portion of its bottom. A cylindrical passage 11i extends from the bottom of the valve seat 11h to an outwardly tapered passage 11j in the hollow boss 11d. A shoulder 11k is provided between the cylindrical bore 11i and the passage 11j.

The cover 12 has a cylindrical skirt 12a for surrounding the open top of the bowl 11. A sealing ring or gasket 16 is seated in a groove 12b formed in the bottom face of the cover adjacent the skirt 12a and projects from this groove to seat on the flat rim 11c of the bowl.

An annular rib 12c depends form the bottom face of the cover in spaced concentric relation inwardly from the skirt 12a. This rib surrounds a stepped passage in the central portion of the cover including a first shoulder 12d, a second shoulder 12e, and a chamber 17 in the axial central portion of the cover. This chamber 17 communicates through a radially extending passage 18 with the outlet boss 12f of the cover.

The cover has an inlet boss 12g communicating with a passage 19 providing a port communicating with the interior of the bowl adjacent the side wall 11a of the bowl. As shown in Figure 7, the rib 12c is cut away at this port 19.

The port arrangement of the cover 12 is such that fluid to be filtered enters the inlet boss 12g and is fed through the port 19 into the top of the bowl 11 adjacent the side wall of the bowl. The fluid fills the entire bowl, and is discharged upwardly through the central chamber 17 in the cover and thence radially through the passage 18 and out of the outlet boss 12f. Before the fluid can leave the bowl to enter the chamber 17, it must pass through a filter cup which, as shown in Figures 5 and 6, can take several forms. In Figure 5, a ceramic filter cup 20 is provided. This cup has an open top sized for fitting within the rib 12c in thrusting relationship against the shoulder 12d. A seal ring 21 overlies the rim wall 20a of the open top of the cup and has a peripheral flange 21a surrounding the cup. This flange 21a is cut away at the port 19, as shown in Figure 7, so as to leave the port unobstructed. The flange 21a prevents shifting of the seal ring on the rim wall 20a and protects the rim edge of the cup 20 against chipping when the cup is being inserted in the cover. Since the filter cup 20 is composer of ceramic material which might chip, a screen disk 22 is preferably mounted on top of the cup to prevent entrainment of any chipped off ceramic material in the outgoing fluid. As shown, the screen is mounted on top of the seal ring 21, and is bottomed on the shoulder 12d.

The bottom of the cup 20 has an annular rib 20b depending therefrom, and a coil spring 23 has one end coil surrounding this rib 20b and bottomed on the cup, and the opposite end coil bottomed in the recess 11g of the bowl. The spring 23 is compressed to urge the cup 20 into constant thrusting relationship with the shoulder 12d of the cover, thereby preventing leakage of unfiltered material from the bowl chamber 15 into the outlet chamber 17.

The alternate arrangement of Figure 6, a screen cup 24 is used in place of the ceramic cup 20, and has an open top bottomed on the second shoulder 12e of the cover 12. This open top of the screen cup fits snugly within the stepped passage between the shoulders 12d and 12e. The cup has a cylindrical side wall 24a and a flat bottom 24b with a depending flange 24c secured to the lower end portion of the side wall 24a thereby providing a retainer for the spring 23 since the upper end coils of the spring are surrounded by the flange 24c.

A comparison of Figures 5 and 6 will show that the cover 12 is adapted to receive either a ceramic-type filter cup 20, or a screen-type cup 24. The fluid in passing from the bowl chamber 15 to the outlet chamber 17 must flow through one of the two types of filter cups, and any solids in the fluid are filtered out.

The filtered-out solids can collect as sediment on the bottom of the bowl and the drain valve 14 is useful for periodic removal of the settled-out sediment. As shown best in Figure 8, the drain valve 14 includes a cylindrical tube 25, a seal washer 26, a coil sring 27, a fiber retainer 28, and a handle 29. The tube 25 is composed of metal and has a sliding fit in the bore 11i of the bowl. It has a closed end 25a with a reduced neck portion 25b bounded on one side by a flat radial shoulder 25c and on the other side by an outwardly flaring flange 25d. The seal ring 26 slips over the flange 25d and snugly hugs the neck 25b. The ring 26 is bottomed on the shoulder 25c and the flange 25d is flattened to the position shown in Figures 5 and 6 for coacting with the shoulder 25c to confine the opposite flat faces of the ring 26. As shown, the flattened flange projects radially beyond the shoulder 25c to form a head H backing up the ring 26 almost to the circumference of the ring. The opposite face of the rink 26 projects radially beyond the shoulder 25c to coact with the seat 11h of the bowl.

The tube 25 has ports 25e adjacent the closed end 25a and joining the cylindrical exterior of the tube with the hollow interior thereof. The opposite end of the tube has a reduced-diameter portion 25f bottomed at a shoulder 25g.

The coil spring 27 fits freely around the tube 25 in the tapered passage 11j of the boss 11d and is bottomed on the shoulder 11k of the boss.

The fiber retainer 28 is cylindrical and fits rather snugly on the tube 25. This retainer 28 has a diameter sized to fit within the enlarged end of the passage 11j of the boss 11d and its end face forms an abutment for the spring 27.

A handle 29, in the form of a flat metal strip, is provided for bottoming the retainer 28 and for facilitating manual operation of the valve. The handle 29 has an aperture 29a receiving the reduced-diameter portion 25f of the tube therethrough to bottom the handle on the tube shoulder 25g. The projecting end of the portion 25f is spun outwardly or headed to form a flange 25h overlying the handle around the aperture 29a thereof and thereby secures the handle to the tube 25.

The valve can be easily assembled in several ways. One method of assembly includes the mounting of the spring 27, the retainer 28, and the handle 29 on the tube 25. The assembly is then applied to the bowl 11 with the tube in the bore 11i and the closed end 25a of the tube projecting above the bottom of the bowl. The seal ring 26 is then slipped over the inclined flange 25d of the tube and is bottomed on the shoulder 25c around the neck portion 25b. The flange 25d is then flattened to form the head 25e. Another method of assembly includes the mounting of the seal ring 26 on the tube, and the insertion of the tube through the bottom of the bowl so that its reduced end 25f will project beyond the boss 11d. The spring, the retainer, and the handle are then inserted in position on the tube, and the portion 25h of the tube is formed to retain the handle against the shoulder 25d.

As shown in Figure 6, the drain valve 14 is spring pressed to a closed position against the seat 11h, and, in this position, the seal ring 26 sealingly engages the seat. When it is desired to open the valve, the handle 14 is depressed toward the boss 11d to raise the tube in the passageway 11i until the ports 25e register with the recess 11g as shown in Figure 5. In this open position, the sediment in the bottom of the bowl will be flushed out with liquid draining through the ports and out of the bottom of the tube. In the open position of the valve, as shown in Figure 5, the fiber retainer 28 will engage the wall of the bore 11j before the handle 29 strikes against the bottom of the boss 11d. Metal to glass contact is thereby avoided. The fiber retainer in the closed position of the valve shown in Figure 6 still projects into the bore 11j and limits lateral movement of the tube 25.

As best shown in Figures 1 to 3, the bail assembly 13 for detachably connecting the bowl and cover includes a bail wire of generally U-shaped configuration with a bight portion 13a passed through aligned slots in ears 12h of a yoke on the central portion of the cover 12. As shown in Figure 2, these ears 12h each have a vertically elongated slot. A cam lever 13b receives the bight portion 13a of the bail wire therethrough and is positioned between the ears 12h. This cam lever 13b is adapted to rock on a flat wall portion 12i of the cover and has a cam surface arranged to raise and lower the bail wire 13 in the slots of the ears 12h as the lever is swung on its rocking surface. When the lever 13b is positioned as shown in dotted lines in Figure 2, the bail wire will be moved to the bottoms of the slots in the ears. When the lever is tilted to the solid line position shown in Figure 2, the cam will raise the bail wire to the tops of the slots. Ears 12j of a second yoke are provided on the inlet port portion 12g of the cover to receive the end of the lever 13b therebetween so that a locking wire or pin (Figures 5 and 6) can be passed through the ears and lever for securing the lever in its bail-closing position.

The bail wire has side legs 13c, 13c straddling the cover and bowl, and the ends of these legs are hooked as at 13d to fit around the bead 11f of the bottom of the bowl and project into the recess 11e. When, as best shown in Figure 2, the lever 13b is in the solid line position for raising the bail wire to the tops of the slots in the ears 12h, the hook ends 13d of the wire will be locked tightly against the bead 11f of the bowl to sealingly connect the bowl 11 and cover 12. Under these conditions, the seal ring or gasket 16 is resiliently loaded so that the top rim face 11c of the bowl will be pressed in sealing contact therewith. When it is desired to separate the cover and bowl, the lever 13b is raised to the dotted-line position of Figure 2, thereby lowering the bail wire in the slots in the ears 12h so that the hook ends 13d of the wire will depend beneath the bead 11f of the bowl. The bail is then swung as illustrated in dotted lines so that the hook ends will clear the bowl, and the bowl and cover are thereby readily separated.

The above descriptions show that the invention provides a filter of the bowl type wherein sediment is easily flushed out of the bowl without separating the bowl from its cover, wherein a universal type cover accommodates different types of filter cups, and wherein a quick-acting bail arrangement detachably connects the bowl and cover.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A filter assembly comprising a container having an open top and a ported bottom, an annular bead depending from said bottom, a hollow boss depending from said bottom around the port thereof and radially inward from said bead, a valve seat in said container around said port, a tube extending through said boss and slidably mounted in said port, a head on said tube coacting with said seat, ports in said tube adapted to be placed into and out of registration with the interior of the container, a spring surrounding said tube, a retainer surrounding said tube and bottoming said spring, a handle on said tube bottoming said retainer, said retainer fitting within said hollow boss and adapted to guide the tube longitudinally of the boss and port during opening and closing movements thereof, a cover for the open top of the container, a bail mounted on said cover and having hook ends selectively engaging said bead on the container on opposite sides of said hollow boss, a cam on said bail coacting with said cover to tighten the bail on said bead of the container, said cover having an inlet port communicating with the top of the container adjacent the side wall thereof, said cover having an outlet port communicating with the central portion of the container, a filter cup in said container separating said cover ports and bottomed on said cover, and a spring bottomed on said container acting on said cup to hold the cup in sealed engagement with the cover.

2. In a filter unit, a container having a valve seat at the bottom thereof, a cylindrical passageway extending from said seat, a tapered passageway diverging from the cylindrical passageway, a shoulder separating the tapered passageway and the cylindrical passageway, a tube slidable in said cylindrical passageway and having a closed end, a rubber seal surrounding the closed end of the tube and engaging the valve seat, said tube having ports adjacent the closed end, a spring bottomed on said shoulder, a handle on said tube, a retainer surrounding the tube bottomed on said handle, said spring being bottomed on said retainer, and said retainer being sized for fitting in said tapered passageway to center the tube in the passageways, said retainer limiting upward movement of the tube to permit uncovering of said tube port but to limit further upward movement of the tube after the ports are completely uncovered.

3. A bowl-type filter comprising a bowl having an open top and a ported bottom, a spring-pressed tube slidable in said port and having a seal thereon urged against the bottom by said spring together with ports therethrough adapted to register with the bowl when the tube is depressed against the pressure of the spring, a cover for the open top of said bowl having an inlet port registering with the top of the bowl near the side thereof and an outlet port registering with the top of the bowl at the axial central portion thereof, a stepped bore in the cover having a plurality of bore diameters sized for receiving the open ends of filter cups of different diameters, a bail in the cover having hooked ends engageable with the bottom of the bowl radially outwardly of the bottom port, and a cam on said bail coacting with the cover to tighten the hooked ends on the bowl bottom.

4. A bowl-type filter comprising a glass bowl having an open top and a ported bottom, a spring-pressed tube slidable in said port and having a seal thereon urged against the bottom of said bowl by said spring, said tube having radial passages adapted to register with the bowl when the tube is depressed against the pressure of the spring, a retainer disposed about a portion of said tube below said passages, said retainer being of soft material relative to said bowl and cooperating with the portion of said bowl about said port to limit upward movement of said tube relative to said bowl, a cover for the open top of said bowl having an inlet port registering with the top of the bowl near the sides thereof and an outlet port registering with the top of the bowl at the axial central portion thereof, a filter element depending into said bowl in the flow passageway between said inlet and said outlet ports and spring means holding the filter element around the outlet port in sealed engagement with the cover.

RUSSELL R. CURTIS.

REFERENCES CITED

The following references are of record in the file of this patent:

UNITED STATES PATENTS

| Number | Name | Date |
|---|---|---|
| 1,027,919 | Smith | May 28, 1912 |
| 1,062,236 | Hitchcock | May 20, 1913 |
| 1,107,485 | Bowser | Aug. 18, 1914 |
| 1,148,689 | Kepple | Aug. 3, 1915 |
| 1,352,961 | Hills | Sept. 14, 1920 |
| 1,574,336 | Blydenburgh | Feb. 23, 1926 |
| 1,709,237 | Tekavec | Apr. 16, 1929 |
| 1,780,774 | White | Nov. 4, 1930 |
| 1,781,964 | Thomas et al. | Nov. 18, 1930 |
| 2,071,996 | Baldwin | Feb. 23, 1937 |
| 2,183,616 | Korte | Dec. 19, 1939 |
| 2,230,408 | Lackey | Feb. 4, 1941 |
| 2,378,949 | Post | June 26, 1945 |
| 2,423,329 | LeClair | July 1, 1947 |
| 2,431,782 | Walton et al. | Dec. 2, 1947 |

FOREIGN PATENTS

| Number | Country | Date |
|---|---|---|
| 351,705 | Great Britain | July 2, 1931 |
| 523,919 | Great Britain | July 25, 1940 |

OTHER REFERENCES

Ingenious Mechanisms for Designers and Inventors, by Jones, pages 5 and 6, 1930.